(12) United States Patent
Raphaeli et al.

(10) Patent No.: US 6,466,613 B1
(45) Date of Patent: Oct. 15, 2002

(54) COMMUNICATIONS TRANSCEIVER UTILIZING A SINGLE FILTER

(75) Inventors: Dan Raphaeli, Kfar-Saba; Evgeni Bassin, Sheva, both of (IL)

(73) Assignee: Itran Communications Ltd., Beersheva (IL)

( * ) Notice: Subject to any disclaimer, the term of this patent is extended or adjusted under 35 U.S.C. 154(b) by 0 days.

(21) Appl. No.: 09/299,093

(22) Filed: Apr. 26, 1999

(51) Int. Cl.[7] .............................. H04B 1/38; H04L 5/16
(52) U.S. Cl. .......................................... 375/219; 455/83
(58) Field of Search .............................. 375/219, 222; 455/78, 83; 370/278, 282, 296

(56) References Cited

U.S. PATENT DOCUMENTS

| 5,179,572 A | 1/1993 | Schilling |
| 5,237,587 A | 8/1993 | Schoolcraft |
| 5,574,748 A | 11/1996 | Vander Mey et al. |
| 5,815,048 A | * 9/1998 | Ala-Kojola et al. ........ 333/101 |

* cited by examiner

*Primary Examiner*—Don N. Vo
(74) *Attorney, Agent, or Firm*—Howard Zaretsky

(57) ABSTRACT

A communications transceiver constructed to minimize the additional external components required for interfacing to the communications medium. The invention includes a communications transceiver with a reduced number of filters comprising a host interface, a control module, a transmit portion and a receive portion. The host interface is coupled to a host computer and functions to exchange transmit, receive and control related data to and from the transceiver. A novel aspect of the invention includes using the same filter for both receiving and transmitting. The single filter plays a dual role, providing filtering function during both receive operation and transmit operation, thus serving to minimize the external components required, the cost of the device and its complexity. A switching device, such as an analog switch, connects the filter either to the output of the transmitter during transmit operation or to the output of the communications medium interface during receive operation.

19 Claims, 3 Drawing Sheets

COMMUNICATIONS TRANSCEIVER UTILIZING A SINGLE FILTER

FIELD OF THE INVENTION

The present invention relates generally to communications systems and more particularly relates to a half duplex digital communications system that utilizes a single filter for both transmit and receive purposes.

BACKGROUND OF THE INVENTION

Digital communications systems are currently in wide spread use. The number of products incorporating communications features (wireless or wired) is growing at an ever increasing rate. A factor fueling the decision to add communication features to products that were traditionally without communications capability is the decreasing cost and the reduced space required by the communications circuitry. Large cost reductions combined with smaller footprints have made it practical and economic for manufacturers to add communications features to their products.

Manufacturers and designers are constantly attempting to reduce the cost and size of communications circuitry. Thus, it is desirable to be able to reduce the size and cost of communications systems even further.

A block diagram illustrating a prior art half-duplex communications transceiver is shown in FIG. 1. The communications transceiver, generally referenced 10, comprises a host interface 12 and a control module 28. The host interface is coupled to a host computer, processor, circuit or other computing device and functions to exchange transmit, receive and control related data to and from the transceiver 10. The transmit path comprises transmitter 14, Tx filter 16 and output Tx buffer 18. The receive path comprises input Rx buffer 22, Rx filter 24 and receiver 26. A communication medium interface 20 couples the Tx buffer 18 and the Rx buffer 22 to the communications medium.

The transceiver 10 functions as a bidirectional half duplex transceiver node. The control module 28 functions to enable and control the receiver 26, Rx buffer 24, transmitter 14 and the Tx buffer 18. In operation, the host supplies data to be transmitted to the transmitter 14. The transmitter 14 functions to encode and process the data. The signal output of the transmitter passes through a Tx filter 16 to filter out unwanted signal components. The filtered signal output of the Tx filter 16 is then amplified via output amplifier/buffer 18 and subsequently coupled to the transmission medium via communications medium interface 20.

During reception, the signal is received from the communications medium via the communications medium interface 20. The receive signal is buffered via Rx input buffer 24 and subsequently input to a Rx filter 24 which functions to remove any out of band noise and interference present on the medium. The filtered receive signal is then input to the receiver 26 where it is processed and decoded. The receiver then outputs the signal to the host interface 12 which sends it to the host.

Note that the prior art communications transceiver node described above is general in nature with only basic components shown and described. Each transceiver node in the communication network, however, comprises these basic elements and may have additional filters, buffers, amplifiers, etc. as part of its circuitry.

A disadvantage of the prior art transceiver node described in FIG. 1, is that depending on the parameters of the components, the use of both Tx and Rx filters in the transceiver may be superfluous. Since the transceiver is half duplex, only one filter is used at a time. Thus, the component count can be reduced if one filter were shared for both transmit and receive functions. This would reduce the size and cost of the communications transceiver.

SUMMARY OF THE INVENTION

The present invention is a communications transceiver constructed to minimize the additional external components required for interfacing to the communications medium. The principles of the present invention are illustrated using as an example, a half duplex receiver/transmitter that embodies a reduced component count design. The invention also includes a communications transceiver with a reduced number of filters.

The communications transceiver comprises a host interface, a control module, a transmit portion and a receive portion. The host interface is coupled to a host computer and functions to exchange transmit, receive and control related data to and from the transceiver. The transmit portion comprises a transmitter, analog switch, dual function filter and output Tx buffer. The receive portion comprises an input Rx buffer, dual function filter and receiver. A communication medium interface couples the Tx output buffer and the Rx input buffer to the communications medium.

In accordance with a key feature of the invention, the same filter is used for both receiving and transmitting. The single filter plays a dual role, providing filtering functions during both receive operation and transmit operation. This serves to minimize the external components required, the cost of the device and its complexity.

The filter functions to remove out of band noise and interference present on the medium. The filtered receive signal is input to the receiver where it is processed and decoded. The receiver then outputs the signal to the host interface which forwards the receive data it to the host.

A switching device, such as an analog switch, performs the switching function of connecting the filter either to the output of the transmitter during transmission or connecting the filter to the output of the communications medium interface during reception. During transmission, an output amplifier functions to amplify the output of the filter before the communication medium interface couples the signal onto the medium. During reception, the output amplifier is disabled and the signal received from the communications medium interface is filtered and then input to the receiver.

There is provided in accordance with the present invention a communications transceiver coupled to a host and to a communications medium comprising a host interface coupled to the host, the host interface operative to transmit and receive data and control information to and from the host, a communications medium interface coupled to the communications medium adapted to electrically couple the transceiver to the communications medium, a transmitter coupled to the host interface, the transmitter adapted to encode and modulate a transmit signal in accordance with transmit data to be transmitted, a receiver coupled to the host interface, the receiver adapted to decode and demodulate signals received from the communications medium interface so as to yield receive data, a filter coupled to the receiver and to the communications medium interface, the filter adapted to filter signals received from the communications medium interface and to filter signals output of the transmitter and a switch including a first input, a second input and an output, the first input coupled to the output of the transmitter, the second input coupled to the communications medium interface, the output coupled to the filter, wherein in a transmit mode the switch is operative to couple the first input to the filter, and wherein in a receive mode, the switch is operative to coupled the second input to the filter.

The switch further comprises switching time reduction means for reducing the transient response at the output of the filter, and wherein the switching time reduction means comprises an RC network.

There is also provided in accordance with the present invention, in a communications transceiver coupled to a host and to a communications medium, a method of processing receive and transmit signals, the method comprising the steps of providing a host interface for transmitting and receiving data and control information to and from the host, providing a communications medium interface for interfacing to the communication medium, encoding and modulating a transmit signal in accordance with transmit data to be transmitted, decoding and demodulating signals received from the communications medium so as to generate receive data, providing a single filter for filtering signals received from the communications medium interface and for filtering signals to be transmitted over the communications medium, switching, during a transmit mode of operation, the signal input to the single filter to be the signal to be transmitted onto the communication medium and switching, during a receive mode of operation, the signal input to the single filter to be the signal received from the communication medium.

BRIEF DESCRIPTION OF THE DRAWINGS

The invention is herein described, by way of example only, with reference to the accompanying drawings, wherein.

DETAILED DESCRIPTION OF THE INVENTION

| Term | Definition |
| --- | --- |
| A/D | Analog to Digital Converter |
| AC | Alternating Current |
| ASIC | Application Specific Integrated Circuit |
| BJT | Bipolar Junction Transistor |
| CEBus | Consumer Electronics Bus |
| D/A | Digital to Analog Converter |
| DCSK | Differential Code Shift Keying |
| ECC | Error Correcting Code |
| FET | Field Effect Transistor |
| IGBT | Insulated Gate Bipolar Transistor |
| MOSFET | Metal Oxide Semiconductor Field Effect Transistor |
| SPI | Serial Port Interface |

General Description

The present invention is a communications transceiver constructed to minimize the additional external components required for interfacing to a communications medium. In addition, an example embodiment is presented comprising a half-duplex receiver/transmitter. i.e., transceiver, that embodies the reduced component count as taught by the present invention. In particular, the invention is a communications transceiver having a reduced number of filters thus yielding reduced cost and complexity while not sacrificing flexibility of the communications system.

In accordance with the present invention, the transceiver disclosed herein has applications for data communications over noisy channels. The invention comprises a transceiver node coupled to a communications medium. More than one transceiver node may be simultaneously connected to the communication medium. Each transceiver node comprises a transmitter portion and a receiver portion whereby bidirectional half-duplex communications are enabled.

Figure 1:
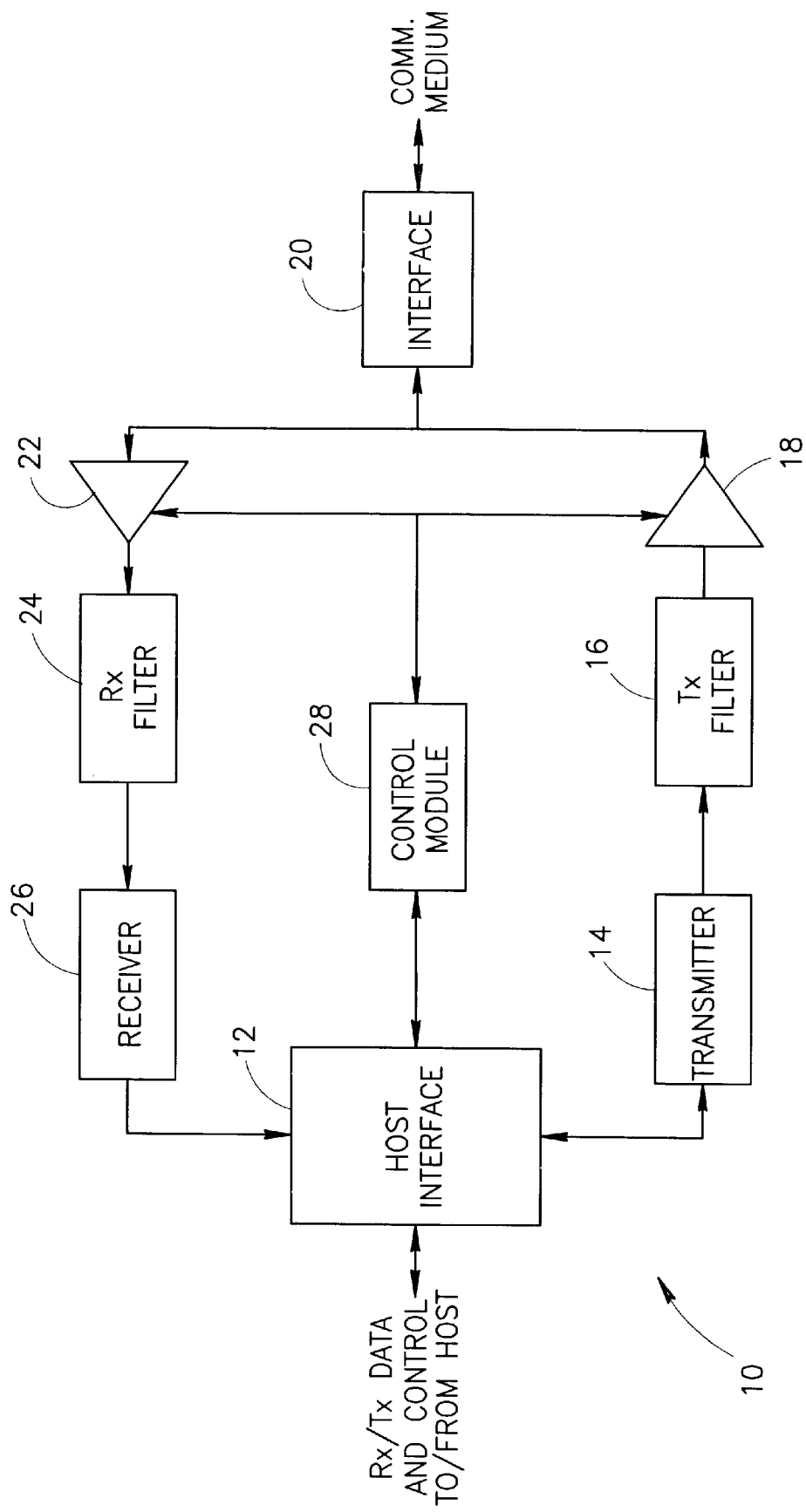
FIG. 1 is a block diagram illustrating a prior art half-duplex communications transceiver.
Figure 2:
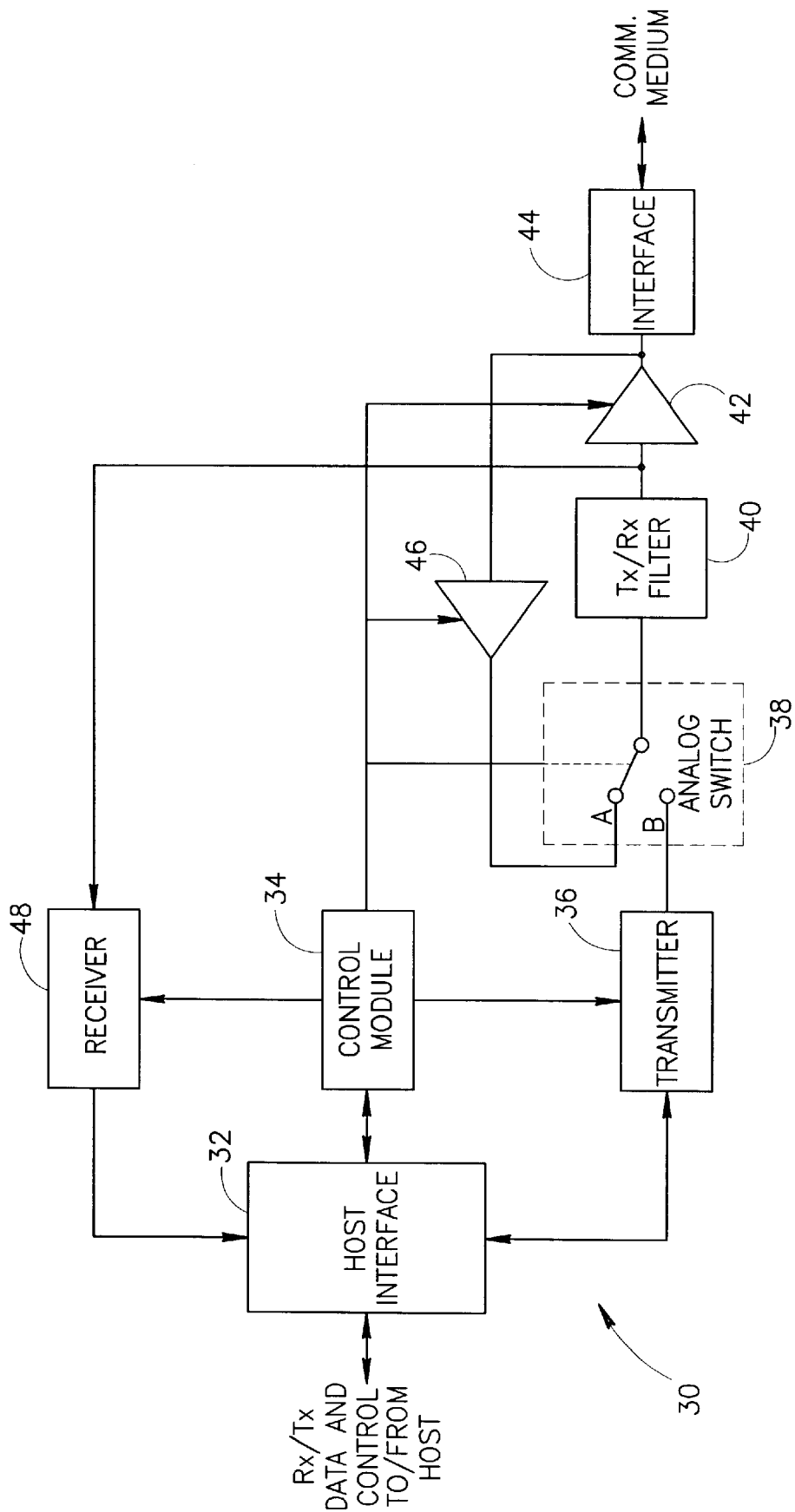
FIG. 2 is a block diagram illustrating a half duplex communications transceiver constructed in accordance with the present invention.

A block diagram illustrating a half-duplex communications transceiver constructed in accordance with the present invention is shown in FIG. 2. The communications transceiver, generally referenced 30, comprises a host interface 32 and a control module 34.

The host interface 32 is coupled to a host computer, processor, circuit or other computing device (not shown) and functions to exchange transmit, receive and control related data to and from the transceiver 30. The transmit path comprises transmitter 36, analog switch 38, Tx/Rx filter 40 and output Tx buffer 42. The receive path comprises input Rx buffer 46, Tx/Rx filter 40 and receiver 48. A communication medium interface 44 couples the Tx output buffer 42 and the Rx input buffer 46 to the communications medium.

The transceiver 30 functions as a bidirectional half duplex transceiver node. The control module 34 functions to enable and control the receiver 48, Rx buffer 46, transmitter 36 and the Tx buffer 42.

In operation, the host supplies data to be transmitted to the transmitter 36. The transmitter 36 functions to encode and process the data packets received from the host interface 32. The signal output of the transmitter passes through an analog switch 38 to a combined Tx/Rx filter 40. The Tx/Rx filter 40 functions to filter out unwanted signal components. The filtered signal is then amplified via Tx output amplifier/buffer 42 and subsequently coupled to the transmission medium via communications medium interface 44.

During the receive mode, the signal is received from the communications medium via the communications medium interface 44. The receive signal is then buffered via Rx input buffer 46 and subsequently input to the combined Tx/Rx filter 40 via analog switch 38. The analog switch comprises two input terminals A and B and an output terminal. The control module 34 provides a control signal to control the position of the switch as shown by the dotted line. During transmit operation, the switch connects terminal B to filter 40, while during receive operation, the switch connects terminal A to filter 40. During receive mode, the control module is operative to place the output Tx buffer in high impedance.

The filter 40 functions to remove out of band noise and interference present on the medium. The filtered receive signal is then input to the receiver 48 where it is processed and decoded. The receiver then outputs the signal to the host interface 32 which forwards the receive data it to the host.

Note that the communications transceiver node 30 described above is shown as an example with only the basic components shown and described. One skilled in the communication arts can modify the transceiver shown to include additional filters, buffers, amplifiers, etc. as part of the circuitry.

The transmitter and receiver can support any suitable communications protocol such as Differential Code Shift Keying (DCSK). The DCSK communication technique is described in detail in U.S. Pat. No. 6,064,695 entitled Spread Spectrum Communication System Utilizing Differential Code Shift Keying, incorporated herein by reference.

In one embodiment, the transceiver 30 may be adapted to transmit/receive DCSK signals in addition to CEBus signals. In addition, the communications medium may comprise the AC power line. The bidirectional half duplex power line carrier communication transceiver can be utilized in different network configurations using similar transceivers coupled to the medium, i.e., the power line. The transmission portion of the transceiver is adapted to transmit packets of data in accordance with the particular protocol in use. The receiver portion is adapted to handle the reception of packets of data while operating either as a DCSK receiver or a CEBus receiver. The receiver is adapted to perform correlation and synchronization of the receive signal.

The transceiver 30 includes components for amplifying the Tx output signal and for coupling the signal to the communication medium, i.e., the power line. A band pass filter is used to filter out unwanted signal components that are the result of transmitter spectral shaping which yields a transmitter output signal whose spectrum contains spurious signals and harmonics. In the receive side, a band pass filter is used to eliminate out of band noise and interference generated from the channel.

In accordance with a key feature of the present invention, a single filter performs the Rx input and Tx output filtering. This serves to minimize the external components required. A single external filter is used for both transmitting and for receiving, thus reducing the number of filters required, the cost of the device and its complexity.

A single filter can be used for both transmitting and receiving if both occur within substantially the same bandwidth. The transmit and receive paths can be switched in and out of the path of the combination Tx/Rx filter using any suitable switching mechanism such as an analog switch. Other suitable devices include, FET switches, MOSFET switches, BJT switches, electromechanical relays, reed relays, IGBTs, etc. With any switch implementation, it is preferable that relatively slow rise and fall times are used to control the switch. During transition from transmit to receive and vice versa, a fast filter would cause an undesireable transient response at the output of the filter. To reduce this effect, it is preferable that the switching time be slow enough to avoid transients. Such a slow filter can be realized, for example, utilizing a RC network at the control input of the analog switch, assuming that the analog switch is adapted to receive an analog control voltage.

The use of a combination consisting of the analog switch and the dual function filter results in a large reduction of the number of external components required to realize the transceiver. This advantage is more pronounced when the filters needed by the transmitter and receiver are very large, being constructed from a large number of components.

Figure 3:
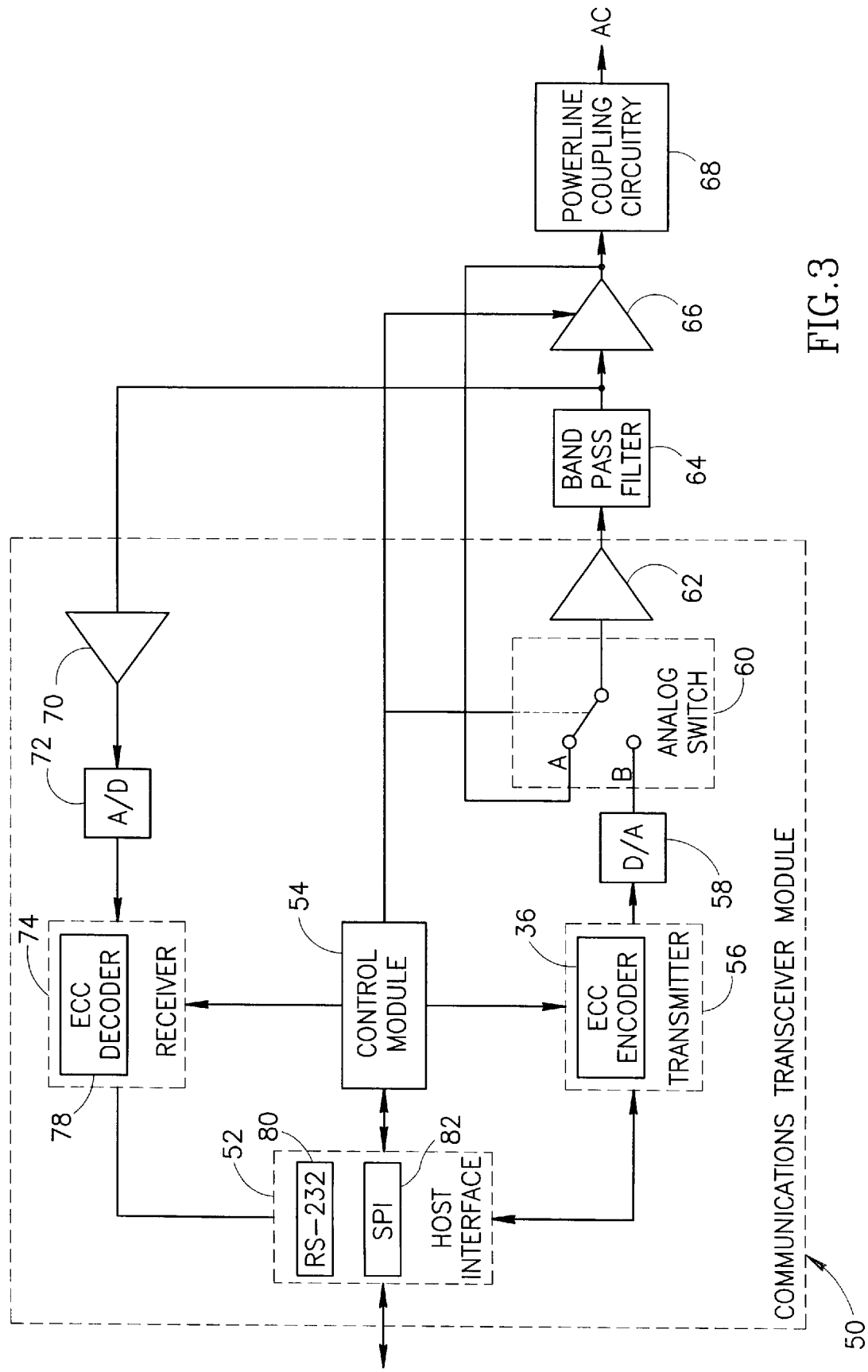
FIG. 3 is a block diagram illustrating an example half-duplex communications transceiver constructed in accordance with the present invention and shown in more detail.

A block diagram illustrating an example half-duplex communications transceiver constructed in accordance with the present invention and shown in more detail is shown in FIG. 3. The embodiment of FIG. 3 comprises a transceiver, generally referenced 50, coupled to a host for sending and receiving Rx, Tx and control data. The transceiver 50 comprises a transmit portion and a receive portion thus enabling bidirectional half-duplex communications.

The transceiver comprises a host interface 52 and control module 54. The host interface 52 is couple to a host computer, processor, circuit or other computing device (not shown) and functions to exchange transmit, receive and control related data to and from the transceiver 50. The host interface comprises a suitable communications interface such as an RS-232 interface 80 and a Serial Port Interface (SPI) 82.

The transmit path comprises transmitter 56, DIA converter 58, analog switch 60, buffer 62, band pass filter 64, buffer 66 and power line interface circuitry 68. During transmit operation, data packets from the host interface 52 to be transmitted are input to the transmitter 56. The transmitter 56 functions to encode (via ECC encoder 76) and process the data packets received from the host interface 52. The signal output of the transmitter is input to a D/A converter 58 that converts the data from the digital domain to the analog domain. The output of the D/A converter is input to terminal B of the analog switch 60. The second terminal A of the analog switch 60 is coupled to the output of buffer 66. During transmission, the signal at terminal B of the analog switch is output to buffer 62. The position of the analog switch is set via a control signal from the control module 54.

The buffered output is subsequently input to the band pass filter 64. The signal is filtered by filter 64 to eliminate unwanted spectral components. The output of the band pass filter 64 is output to an output amplifier 66 that amplifies the signal. The amplified output is coupled to the communication medium, i.e., the power line, via power line coupling circuitry 68. A tristate buffer in output amplifier 66 is controlled and enabled via a signal from control module 54.

During receive operation, the internal analog switch 60 is configured to pass the signal at terminal A to its output. In addition, the output Tx amplifier 66 is disabled during receive operation. The analog input signal received via the power line coupling circuitry 68 is buffered by buffer 62 and subsequently input to the band pass filter 64. The transceiver 50 is unaffected by the impedance of the poser line since the receiving internal buffer 62 exhibits high impedance to the power line and a fixed input impedance to the analog switch.

The buffered signal output of the buffer 62 is input to the band pass filter 64 which functions to filter out of band noise and interference received from the channel. The filtered output is then input to a preamplifier 70 and then input to A/D converter 72. The A/D converter functions to convert the signal from the analog domain to the digital domain. The digital signal is then input to the receiver 74 where it is decoded using ECC decoder 78 and demodulated to generate output Rx data. The output receive data is passed to the host via host interface 52.

Note that the control module 54 functions to enable and control the receiver 74, output amplifier 66, analog switch 60 and transmitter 56. At any point in time, the transceiver is in either the transmit or receive mode.

Note that the communications transceiver node 50 described above is shown as an example with only the basic components shown and described. One skilled in the communication arts can modify the transceiver shown to include additional filters, buffers, amplifiers, etc. as part of the circuitry. In addition, the order of the amplifiers and filters can be replaced.

In accordance with a key feature of the present invention, the single band pass filter 64 performs both Rx input and Tx output filtering. This serves to minimize the external components required when, for example, the receiver and transmitter are implemented on the same ASIC. A single external filter is used for both transmitting and for receiving, thus reducing the number of filters required, the cost of the device and its complexity.

A single filter can be used for both transmitting and receiving if both operations take place within substantially the same bandwidth. Preferable, relatively slow rise and fall times are used to control the switch. The use of a combination consisting of the analog switch and the dual function filter results in a large reduction of the number of external components required to realize the transceiver. This advantage is more pronounced when the filters needed by the transmitter and receiver would normally be very large, being constructed from a large number of components.

While the invention has been described with respect to a limited number of embodiments, it will be appreciated that many variations, modifications and other applications of the invention may be made.

What is claimed is:

1. A communications transceiver coupled to a communications medium, comprising:

a transmitter adapted to encode and modulate a transmit signal in accordance with data to be transmitted;

a unidirectional filter having an input and an output, said filter adapted to have the same passband for both transmission and reception and to filter said transmit signal during transmit mode and to filter a receive signal during receive mode;

a receiver adapted to decode and demodulate said receive signal output from said filter to yield receive data therefrom;

a buffer adapted to buffer the output of said filter to a communications medium;

a switch having a first input coupled to the output of said transmitter, a second input coupled to said communications medium and an output coupled to the Input of said filter; and control means adapted to configure said switch to couple the output of said transmitter to the input of said filter and to enable said buffer during said transmit mode, and to configure said switch to couple said receive signal received from said communications medium to the input of said filter and to place said buffer in a high impedance state said receive mode.

2. The communications transceiver according to claim 1, wherein said communications medium comprises an AC power line.

3. The communications transceiver according to claim 1, wherein said filter comprises a band pass filter.

4. The communications transceiver according to claim 1, wherein said switch further comprises switching time reduction means for reducing the transient response at the output of said filter.

5. The communications transceiver according to claim 4, wherein said switching time reduction means comprises a RC network.

6. A method of processing receive and transmit signals in a communications transceiver coupled to a communications medium, said method comprising the steps of:

providing a unidirectional filter adapted to filter signals received from said communications medium and to filter signals to be transmitted over said communications medium, wherein said unidirectional filter is adapted to have the same passband for both transmission and reception;

applying said transmission signals to the input of said unidirectional filter during transmission and coupling the output of said unidirectional filter lo said communications medium; and applying the signal received from said communications medium to the input of said unidirectional filter during reception and outputting a filtered receive signal.

7. The method according to claim 6, wherein said communications medium comprises an AC power line.

8. The method according to claim 6, wherein said step of providing a single filter comprises the step of providing a band pass filter.

9. The method according to claim 6, wherein said steps of switching comprise the step of slowly switching between transmit and receive and receive and transmit, so as to reduce the transient response at the output of said single filter.

10. The method according to claim 9, wherein said step of slow switching comprises the step of providing a RC network.

11. An apparatus for performing transmit and receive filtering using a single filter, comprising:

an unidirectional filter having an input and output, said output coupled to a receiver and the input of a transmit buffer, said filter adapted to have the same passband for both transmission and reception;

said transmit buffer adapted to couple the output of said filter to a communications medium during a transmit mode of operation and to enter a high impedance state during a receive mode of operation; and switching means adapted to couple a receive signal from said communications medium to the input of said filter during said receive mode of operation and to couple a transmit signal to the input of said filter drum said transmit mode of operation.

12. The apparatus according to claim 11, wherein said communication medium comprises the AC powerline.

13. The apparatus according to claim 11, further comprising buffer means coupled between the output of said switching means and the input of said filter.

14. The apparatus according to claim 11, wherein said filter comprises a band pass filter.

15. The apparatus according to claim 11, further comprising a coupling circuit coupled between the output of said transmit buffer and said communications medium.

16. The apparatus according to claim 11, wherein said switching means comprises a semiconductor based single pole double throw switch.

17. The apparatus according to claim 11, wherein said transmit buffer comprises a 3-state buffer amplifier.

18. The apparatus according to claim 11, adapted to be implemented in an Application Specific Integrated Circuit (ASIC).

19. The apparatus according Lo claim 11, wherein said switching means is controlled using relatively slow rise and fall times in order to minimize undesireable transmit response at the output of said filter.

* * * * *